United States Patent
Zhou

(10) Patent No.: US 10,460,148 B2
(45) Date of Patent: *Oct. 29, 2019

(54) METHOD FOR CONTROLLING UNLOCKING AND MOBILE TERMINAL

(71) Applicant: GUANGDONG OPPO MOBILE TELECOMMUNICATIONS CORP., LTD., Dongguan (CN)

(72) Inventor: Yibao Zhou, Dongguan (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 201 days.

This patent is subject to a terminal disclaimer.

(21) Appl. No.: 15/601,659

(22) Filed: May 22, 2017

(65) Prior Publication Data

US 2017/0344798 A1 Nov. 30, 2017

(30) Foreign Application Priority Data

May 30, 2016 (CN) .......................... 2016 1 0375834

(51) Int. Cl.
*G06K 9/00* (2006.01)
*G03B 7/00* (2014.01)
*G06F 21/32* (2013.01)

(52) U.S. Cl.
CPC ......... *G06K 9/00087* (2013.01); *G06F 21/32* (2013.01); *G06K 9/00013* (2013.01); *G06K 9/00026* (2013.01); *G06K 9/00067* (2013.01)

(58) Field of Classification Search
USPC .............. 382/24, 124, 318; 348/362, E3.018
See application file for complete search history.

(56) References Cited

U.S. PATENT DOCUMENTS

| 6,011,859 | A | 1/2000 | Kalnitsky et al. |
| 6,817,130 | B2 | 11/2004 | Ivanov |
| 6,879,344 | B1 | 4/2005 | Nakamura et al. |
| 7,738,704 | B2 | 6/2010 | Lienhart |
| 8,310,372 | B2 * | 11/2012 | Kukula .............. G06K 9/00006 340/5.53 |

(Continued)

FOREIGN PATENT DOCUMENTS

| CN | 102004592 A | 4/2011 |
| CN | 102609204 A | 7/2012 |

(Continued)

OTHER PUBLICATIONS

Jea T-Y et al., A minutia-based partial fingerprint recognition system[J], "Pattern Recognition", Oct. 1, 2005, 38(10):1672-1684, GB.

(Continued)

*Primary Examiner* — Kathleen Y Dulaney
(74) *Attorney, Agent, or Firm* — Young Basile Hanlon & MacFarlane, P.C.

(57) ABSTRACT

A method for controlling unlocking may include the following. The number of feature points in a current feature point set of a user finger is acquired. When the number of the feature points in the current feature point set is greater than or equal to a first preset threshold and when the current feature point set matches with a pre-saved fingerprint template, a mobile terminal is unlocked. A related mobile terminal is also provided.

14 Claims, 6 Drawing Sheets

(56) References Cited

U.S. PATENT DOCUMENTS

| | | | |
|---|---|---|---|
| 8,723,827 B2 * | 5/2014 | Wright | G06F 3/044 |
| | | | 345/156 |
| 9,805,242 B2 * | 10/2017 | Cho | G06F 21/32 |
| 2002/0181749 A1 * | 12/2002 | Matsumoto | G06K 9/00006 |
| | | | 382/125 |
| 2003/0035571 A1 | 2/2003 | Haselsteiner | |
| 2003/0147550 A1 * | 8/2003 | Shigeta | G06K 9/00013 |
| | | | 382/124 |
| 2003/0156744 A1 * | 8/2003 | Hashimoto | G06K 9/00013 |
| | | | 382/124 |
| 2005/0129292 A1 * | 6/2005 | Morgeneier | G06K 9/00026 |
| | | | 382/124 |
| 2008/0075332 A1 | 3/2008 | Fujisawa | |
| 2008/0199057 A1 | 8/2008 | Hsieh | |
| 2008/0226132 A1 | 9/2008 | Gardner | |
| 2011/0279664 A1 * | 11/2011 | Schneider | G06K 9/0002 |
| | | | 348/77 |
| 2013/0329967 A1 * | 12/2013 | Abiko | G06K 9/00026 |
| | | | 382/115 |
| 2014/0093143 A1 | 4/2014 | Thompson et al. | |
| 2014/0270413 A1 | 9/2014 | Slaby et al. | |
| 2014/0355846 A1 * | 12/2014 | Lee | G06K 9/0004 |
| | | | 382/124 |
| 2015/0047017 A1 * | 2/2015 | Kim | G06F 21/32 |
| | | | 726/19 |
| 2015/0063661 A1 | 3/2015 | Lee et al. | |
| 2015/0254446 A1 * | 9/2015 | LaCous | G06F 21/32 |
| | | | 726/19 |
| 2015/0269409 A1 | 9/2015 | Weber | |
| 2016/0148037 A1 * | 5/2016 | Baek | G06K 9/0002 |
| | | | 345/174 |
| 2016/0253539 A1 | 9/2016 | Shen et al. | |
| 2017/0220846 A1 * | 8/2017 | Du | G06K 9/00026 |

FOREIGN PATENT DOCUMENTS

| | | |
|---|---|---|
| CN | 104008319 A | 8/2014 |
| CN | 105022984 A | 11/2015 |
| CN | 105389566 A | 3/2016 |
| WO | 2015073413 A1 | 5/2015 |

OTHER PUBLICATIONS

Chan K C et al., Fast fingerprint verification using subregions of fingerprint images[J], "Circuits & Systems for Video Technology IEEE Transactions on", Jan. 1, 2004, 14(1):95-101, USA.

Extended European search report issued in corresponding European application No. 17169801.2 dated Oct. 9, 2017.

* cited by examiner

METHOD FOR CONTROLLING UNLOCKING AND MOBILE TERMINAL

CROSS REFERENCE TO RELATED APPLICATIONS

This application claims priority to Chinese Patent Application No. 201610375834.X, filed on May 30, 2016, the content of which is hereby incorporated by reference in its entirety.

TECHNICAL FIELD

The present disclosure relates to the technical field of mobile terminals, and particularly to a method for controlling unlocking and a mobile terminal.

BACKGROUND

Fingerprints refer to prints formed by uneven skins on human finger pulps at ends of human fingers. Human fingerprints are subjected to genetic and environmental interaction, and also closely related to the human health, so everyone has fingerprints, but the fingerprints are different. Because the repetitive rates of the fingerprints are very low, which is about one in 15 billion, the fingerprints are so called "human identity cards." Based on such feature, the fingerprints are widely used as identity authentication information.

For example, a fingerprint identification technology has become a standard configuration for flagship models of mainstream mobile terminal manufacturers. A fingerprint identification process includes feature extracting, data saving, and image matching. After an original image of the human fingerprint is read through a fingerprint identification sensor, the image is matched with a pre-saved registered fingerprint template firstly, and then the mobile terminal is unlocked after the matching is successful.

The unlocking speed directly affects the efficiency of the user for using a device. The unlocking speed has become a major product competition highlight of various manufactures. Therefore, how to reduce the unlocking time to improve the unlocking efficiency is an important research field.

BRIEF DESCRIPTION OF THE DRAWINGS

To better illustrate the technical solution of embodiments of the present disclosure or the technical solution of the present technology, the following descriptions will briefly illustrate the accompanying drawings described in the embodiments or the present technology. Obviously, the following described accompanying drawings are some embodiments of the present disclosure. Those skilled in the art can obtain other accompanying drawings according to the described accompanying drawings without creative efforts.

DETAILED DESCRIPTION

In order to make a better understanding of technical solutions of the present disclosure by those skilled in the art, the technical solutions of embodiments of the present disclosure will be described clearly and completely in combination with the accompanying drawings of the embodiments of the present disclosure. Obviously, the described embodiments are merely a part of embodiments of the present disclosure, and not all of the embodiments. All other embodiments obtained by those skilled in the art without creative efforts based on the embodiments of the present disclosure shall fall within the protection scope of the present disclosure.

Terms "first", "second", "third", "fourth", and so on used in the specification, appended claims, and accompanying drawings of the present disclosure are used to distinguish different objects rather than describe specific sequences. Additionally, terms "include", "have", and any deformation thereof are intended to cover non-exclusive inclusion relationship. For example, a process, method, system, product, or device including a series of steps or units is not limited to listed steps or units, and In at least one alternative embodiment, can include steps or units which are not listed, or In at least one alternative embodiment, can further include other inherent steps or units for the process, method, product, or device.

The "embodiments" mentioned herein means that particular features, structures or characteristics described with reference to the embodiments may be included in at least one embodiment of the disclosure. Phrases appearing at various positions of the specification neither always refer to the same embodiment, nor separate or alternative embodiments that are mutually exclusive with other embodiments. It is explicitly and implicitly understood by those skilled in the art that the embodiments described herein may be combined with other embodiments.

Figure 7:
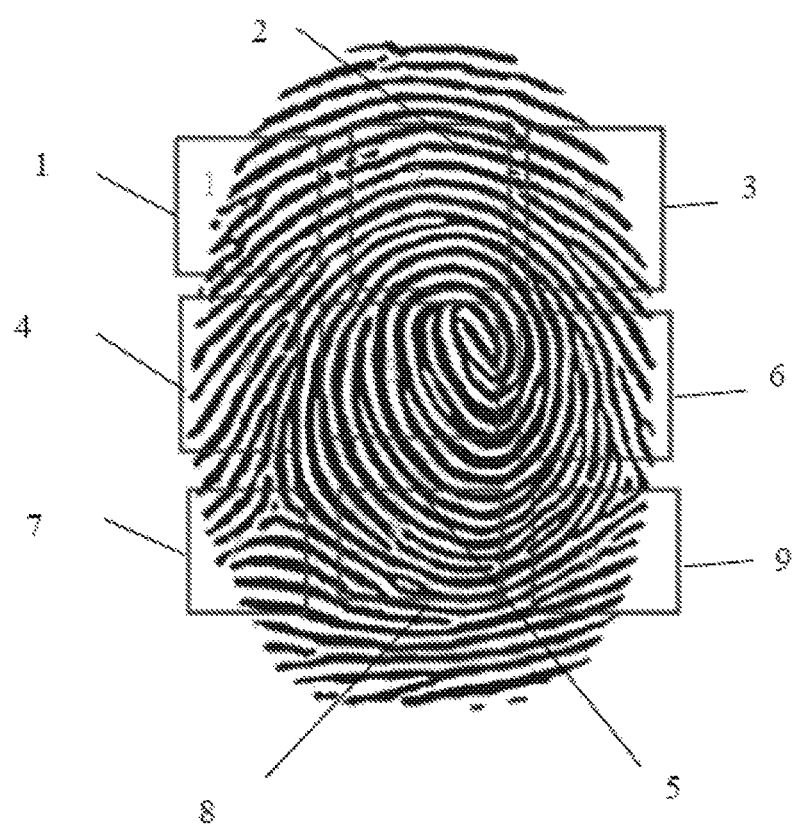
FIG. 7 is a schematic diagram illustrating an example of a fingerprint template.

In the present disclosure, the term "fingerprint template" means that, when a fingerprint function of a terminal such as a mobile phone is enabled for the first time, the user may be asked to undergo a fingerprint registration process. During the fingerprint registration, the user puts his or her finger on a fingerprint sensor for fingerprint image reception, and fingerprint feature information of the received fingerprint images will be extracted to form a fingerprint template, usually, one finger corresponds to one fingerprint template. Generally, the fingerprint sensor may receive 10-20 times for each finger in order to receive the whole fingerprint face and generate a comprehensive fingerprint template. FIG. 7 illustrates an exemplary fingerprint template, and each number marked in the fingerprint of FIG. 7 refers to fingerprint feature information.

In the following, when we refer to "receive" or "receiving" fingerprint image or fingerprint data, it means that a mobile terminal or a fingerprint recognition sensor of the mobile terminal or other related components of the mobile terminal can acquire, collect, obtain or in other manners to get the fingerprint image or fingerprint data. The present disclosure is not limited thereto.

The present disclosure relates to a method for controlling unlocking. The method may include the follows. The number of feature points in a current feature point set of a user finger is acquired. The current feature point set is formed by scanning and processing the user finger through a sensing electrode set. The sensing electrode set includes sensing electrodes from the $[M/2]-k11^{th}$ to the $[M/2]+k12^{th}$ row in a sensing electrode array of M-rows N-columns, the sensing electrode array is arranged in a fingerprint identification sensor of a mobile terminal, and M, N, k11, and k12 are positive integers. The mobile terminal is unlocked when the number of the feature points in the current feature point set is greater than or equal to a first preset threshold and the current feature point set matches with a pre-saved fingerprint template.

The present disclosure further relates to a mobile terminal to execute the method for controlling unlocking. The terminal illustrated in the embodiments of the present disclosure may include a smart phone (e.g., Android phone, iOS phone, Windows Phone, etc.), a tablet computer, a palmtop computer, a laptop computer, a mobile internet device (MID) or a wearable device. The terminal in the present disclosure can also include an automated teller machine (ATM), a ticket machine, an entrance guard machine, medical equipment, and other terminal equipped with fingerprint recognition function. The foregoing terminal is only exemplary rather than exhaustive. The present disclosure is not limited to the foregoing terminal.

In order to better understand the method for controlling unlocking and the mobile terminal disclosed in the embodiments of the disclosure, the embodiments of the disclosure will be described in detail hereinafter.

Figure 1:
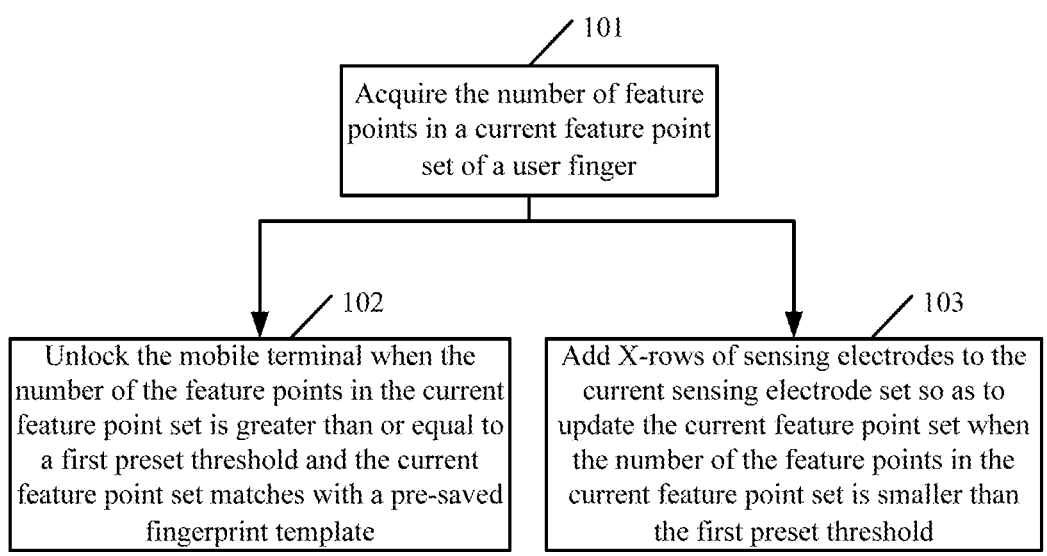
FIG. 1 is a flow chart of a method for controlling unlocking in accordance with an embodiment of the present disclosure.

FIG. 1 is a method for controlling unlocking in accordance with an embodiment of the present disclosure. As illustrated by FIG. 1, the method for controlling unlocking may begin at block 101.

At block 101, a mobile terminal acquires the number of feature points in a current feature point set of a user finger. The current feature point set is formed by the mobile terminal scanning and processing the user finger according to a current sensing electrode set. The current sensing electrode set includes sensing electrodes in lines from the $[M/2]-k11^{th}$ to $[M/2]+k12^{th}$ row in a sensing electrode array of M-rows N-columns. The sensing electrode array is arranged in a fingerprint identification sensor of the mobile terminal, and M, N, k11 and k12 are positive integers.

When the mobile terminal is in a black-screen status or a bright-screen and screen-locking status, [M/2] is a numerical value integrated from M/2, [M/2] is greater than k11, and [M/2]+k12 is smaller than M. The integral function [x] (x is a real number) is used to acquire a maximum integer not greater than x, and the integral function is widely used in computer technology.

The sensing electrodes in the current sensing electrode set are in an intermediate region of the sensing electrode array of the fingerprint identification sensor. Generally, a distinguishing degree of scanning the user finger by the sensing electrodes in the intermediate region is higher than that of scanning the user finger by sensing electrodes in an edge region of the sensing electrode array. Therefore, the sensing electrodes in the current sensing electrode set are herein defined in the lines from the $[M/2]-k11^{th}$ to $[M/2]+k12^{th}$ row in the sensing electrode array of the fingerprint identification sensor, which is beneficial for meeting distinguishing requirements of the mobile terminal on fingerprint unlocking.

For example, when the mobile terminal detects a touch operation of the user finger on the fingerprint identification sensor of the mobile terminal which may be, for example, press or double-click or other touch operations that are not uniquely limited in the embodiment of the disclosure, the mobile terminal wakes up the fingerprint identification sensor and scans the user finger through the current sensing electrode set to acquire fingerprint data, generates a fingerprint image according to the fingerprint data, and extracts feature points according to the fingerprint image to form the current feature point set of the user finger.

As the fingerprint of the user finger includes rugged finger valleys and finger peaks, the mobile terminal can calculate specific distribution of the finger valleys and the finger peaks based on capacitance values formed between the finger valleys and the sensing electrodes (such as capacitive sensors) and capacitance values formed between the finger peaks and the sensing electrodes (such as capacitive sensors).

A working principle is as follows: each sensing electrode of the fingerprint identification sensor is pre-charged to a reference voltage. When the finger contacts with the sensing electrode, as the peak is convex and the valley is concave, a distance between the finger peak and a plane of the sensing electrode is different from that between the finger valley and the plane of the sensing electrode. According to a relationship between capacitance values and distances, different capacitance values may be formed at the positions of the finger peaks and the finger valleys, and then a discharge current is used to discharge. Because the capacitance values corresponding to the finger peaks and the finger valleys are different, the corresponding discharge speeds are also different. The finger peak is close to the sensing electrode, the capacitance is high, and the discharge speed is slower. The finger valley is far from the sensing electrode, the capacitance is low, and the discharge speed is faster. According to different discharge speeds, the positions of the finger peaks and the finger valleys can be determined, so that fingerprint image data corresponding to the user finger is generated.

At block 102, when the mobile terminal detects that the number of the feature points in the current feature point set is greater than or equal to a first preset threshold, the mobile terminal is unlocked when the current feature point set matches with the pre-saved fingerprint template.

Generally, when fingerprint unlocking is performed on the mobile terminal, and a fingerprint image which generally includes at least twenty feature points is generated according to the fingerprint data collected by the fingerprint identification sensor, when the twenty feature points are successfully matched by the mobile terminal, the user identity may be determined to perform the unlocking operation. That is to say, when the mobile terminal acquires twenty feature points, the user identity can be identified, and the basic safety requirements of fingerprint unlocking can be achieved. Therefore, the first preset threshold mentioned above may be any numerical value greater than or equal to twenty and smaller than the quantity of the fingerprint feature points in a pre-saved fingerprint template, such as twenty-one, twenty-two, twenty-three, or the like.

For example, an implementation manner for matching the current feature point set with the pre-saved fingerprint template is as follows.

The mobile terminal calculates a matching degree between each feature point in the current feature point set and the pre-saved fingerprint template, and when the number of the feature points in the current feature point set with a matching degree greater than a preset matching degree is greater than a second preset threshold, the mobile terminal determines that the current feature point set matches with the pre-saved fingerprint template.

An implementation manner for unlocking the mobile terminal is as follows: loading a system application desktop of the mobile terminal; or loading an application interface of an application interrupted in the previous black-screen operation of the mobile terminal; or loading an application interface of a preset application associated with the fingerprint data.

It can be seen that in the method for controlling unlocking of the present disclosure, by gradually enlarging the region of the sensing electrodes for scanning the user finger, the sensing electrode region as small as possible that meets the identification requirements and safety requirements on fingerprint unlocking can be quickly touched, so as to reduce the time that the mobile terminal scans the user finger to the greatest extent.

In at least one alternative embodiment, the method may further include a process at block 103. At block 103, when the mobile terminal detects that the number of the feature points in the current feature point set is smaller than the first preset threshold, X-line sensing electrodes are added to the current sensing electrode set so as to update the current feature point set. The X lines include X1 adjacent lines before the [M/2]−k11 line and X2 adjacent lines after the [M/2]+k12, X1, X2 and X are positive integers, and X1+X2=X.

For example, an implementation manner for the mobile terminal to add X-line sensing electrodes to the current sensing electrode set so as to update the current feature point set is as follows.

The mobile terminal adds the X-line sensing electrodes to the current sensing electrode set so as to update the current sensing electrode set, and scans and processes the user finger so as to update the current feature point set according to the updated current sensing electrode set.

An implementation manner for the mobile terminal to scan and process the user finger so as to update the current feature point set according to the updated current sensing electrode is as follows.

The mobile terminal scans the user finger according to the sensing electrodes in the updated current sensing electrode set so as to acquire the fingerprint data, generates the fingerprint image according to the fingerprint data, and extracts feature points of the fingerprint image, and updates the current feature point set by using the feature points extracted.

An implementation manner for the mobile terminal to scan the user finger according to the sensing electrode in the updated current sensing electrode set so as to acquire the fingerprint data is as follows.

The mobile terminal acquires n2 underlying data values through n2 normal sensing electrodes in the current sensing electrode set updated, the current sensing electrode set includes n1 abnormal sensing electrodes and the n2 normal sensing electrodes, and n1 and n2 are positive integers, and the mobile terminal determines n1 reference underlying data values corresponding to the n1 abnormal sensing electrodes according to the n2 underlying data values collected by the n2 normal sensing electrodes, and the fingerprint data is formed by the n1 reference underlying data values and the n2 underlying data values.

Further, an implementation manner for the mobile terminal to determine the n1 reference underlying data values corresponding to the n1 abnormal sensing electrodes according to the n2 underlying data values collected by the n2 normal sensing electrodes is as follows.

The mobile terminal calculates an average value of the n2 underlying data values, and determines each of the n1 reference underlying data values corresponding to the n1 abnormal sensing electrodes to be the average value.

It is thus clear that the abnormal underlying data values collected by the abnormal sensing electrodes can be modified by the mobile terminal, which is beneficial for improving the accuracy of the fingerprint data, and thus improving the unlocking security.

Further, another implementation manner for the mobile terminal to determine the n1 reference underlying data values corresponding to the n1 abnormal sensing electrodes according to the n2 underlying data values collected by the n2 normal sensing electrodes is as follows.

The mobile terminal acquires a coordinate value of each abnormal sensing electrode of the n1 abnormal sensing electrodes, and performs mean processing on each abnormal sensing electrode according to the coordinate value of each abnormal sensing electrode and the n2 underlying data values, so as to acquire the n1 reference underlying data values corresponding to the n1 abnormal sensing electrodes.

The mean processing includes the follows. x sensing electrodes of the n2 normal sensing electrodes are determined, and a distance between each of the x sensing electrodes and the coordinate value of each of the abnormal sensing electrodes subjected to the current mean processing is smaller than a preset distance. The average value of x underlying data values corresponding to the x sensing electrodes is calculated, and the average value is determined to be the reference underlying data value of each abnormal sensing electrode subjected to the current mean processing, and x is a positive integer.

It is thus clear that the abnormal underlying data values collected by the abnormal sensing electrodes can be modified by the mobile terminal, which is beneficial for improving the accuracy of the fingerprint data, and thus improving the unlocking security.

For the existing fingerprint unlocking solution, all feature points in a fingerprint template feature point set are matched with a reference feature point set of a user finger, and the fingerprint template feature point set of the mobile terminal stores the feature points of the fingerprints of the user finger as comprehensive as possible. Therefore, the number of the feature points in the originally stored fingerprint template feature point set is relatively large, such as 200, 210, or even above 300. While during actual fingerprint unlocking, only 20 effective feature points of the fingerprints of the user finger are generally needed to identify the user identity and perform the unlocking operation. Therefore, in the embodiment of the present disclosure, by gradually enlarging the region of the sensing electrodes for scanning the user finger, the sensing electrode region as small as possible that meets the identification requirements and safety requirements on fingerprint unlocking can be quickly touched, so as to reduce the time that the mobile terminal scans the user finger to the greatest extent. Meanwhile, the time of matching the feature points is further shortened as well by using fewer feature points of the user finger, which is beneficial for enhancing the fingerprint unlocking speed of the mobile terminal, and improving user experience.

Figure 2:
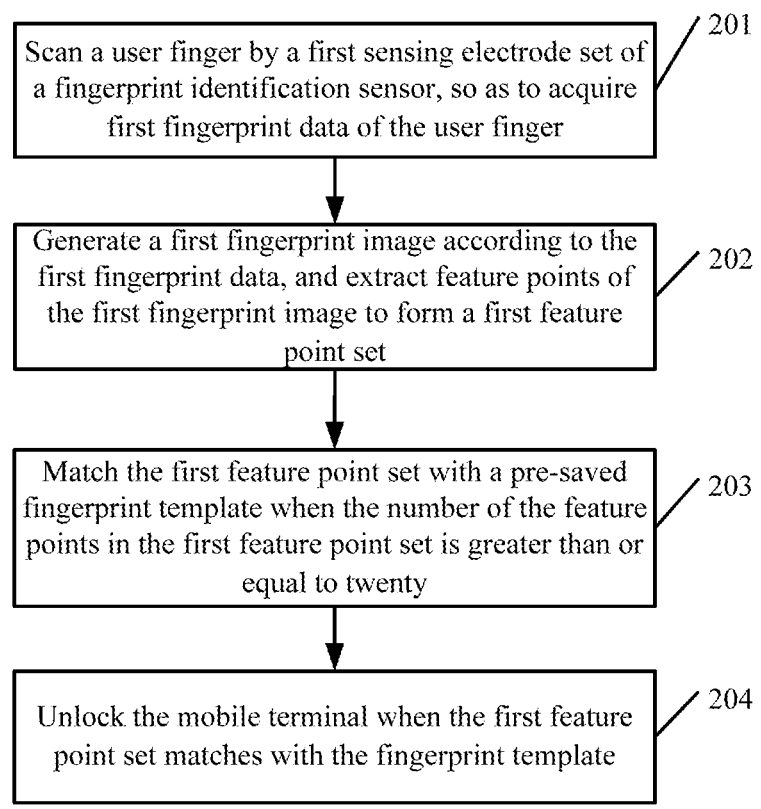
FIG. 2 is a flow chart of another method for controlling unlocking in accordance with an embodiment of the present disclosure.

Consistent with the embodiment as illustrated by FIG. 1, FIG. 2 is a flow chart of another method for controlling unlocking provided by an embodiment of the present disclosure. As illustrated in the FIG. 2, the method for controlling unlocking may begin at block 201.

At block 201, when a mobile terminal detects a touch operation on a fingerprint identification sensor of the mobile terminal, a user finger is scanned by a first sensing electrode set of the fingerprint identification sensor, so as to acquire first fingerprint data of the user finger. The fingerprint identification sensor includes a sensing electrode array of 192-lines 56-rows, and the first sensing electrode set includes sensing electrodes from the $91^{st}$ line to the $101^{st}$ line of the sensing electrode array.

At block 202, the mobile terminal generates a first fingerprint image according to the first fingerprint data, and extracts feature points of the first fingerprint image to form a first feature point set.

At block 203, when the number of the feature points in the first feature point set is greater than or equal to 20, the mobile terminal matches the first feature point set with a pre-saved fingerprint template.

At block 204, when the first feature point set matches with the fingerprint template, the mobile terminal is unlocked.

For the existing fingerprint unlocking solution, all feature points in a fingerprint template feature point set are matched with a reference feature point set of a user finger, and the fingerprint template feature point set of the mobile terminal stores the feature points of the fingerprints of the user finger as comprehensive as possible. Therefore, the number of the feature points in the originally stored fingerprint template feature point set is relatively large, such as 200, 210, or even above 300. While during actual fingerprint unlocking, only 20 effective feature points of the fingerprints of the user finger are generally needed to identify the user identity and perform the unlocking operation. Therefore, in the embodiment of the present disclosure, by gradually enlarging the region of the sensing electrodes for scanning the user finger, the sensing electrode region as small as possible that meets the identification requirements and safety requirements on fingerprint unlocking can be quickly touched, so as to reduce the time that the mobile terminal scans the user finger to the greatest extent. Meanwhile, the time of matching the feature points is further shortened as well by using fewer feature points of the user finger, which is beneficial for enhancing the fingerprint unlocking speed of the mobile terminal, and improving user experience.

Figure 3:
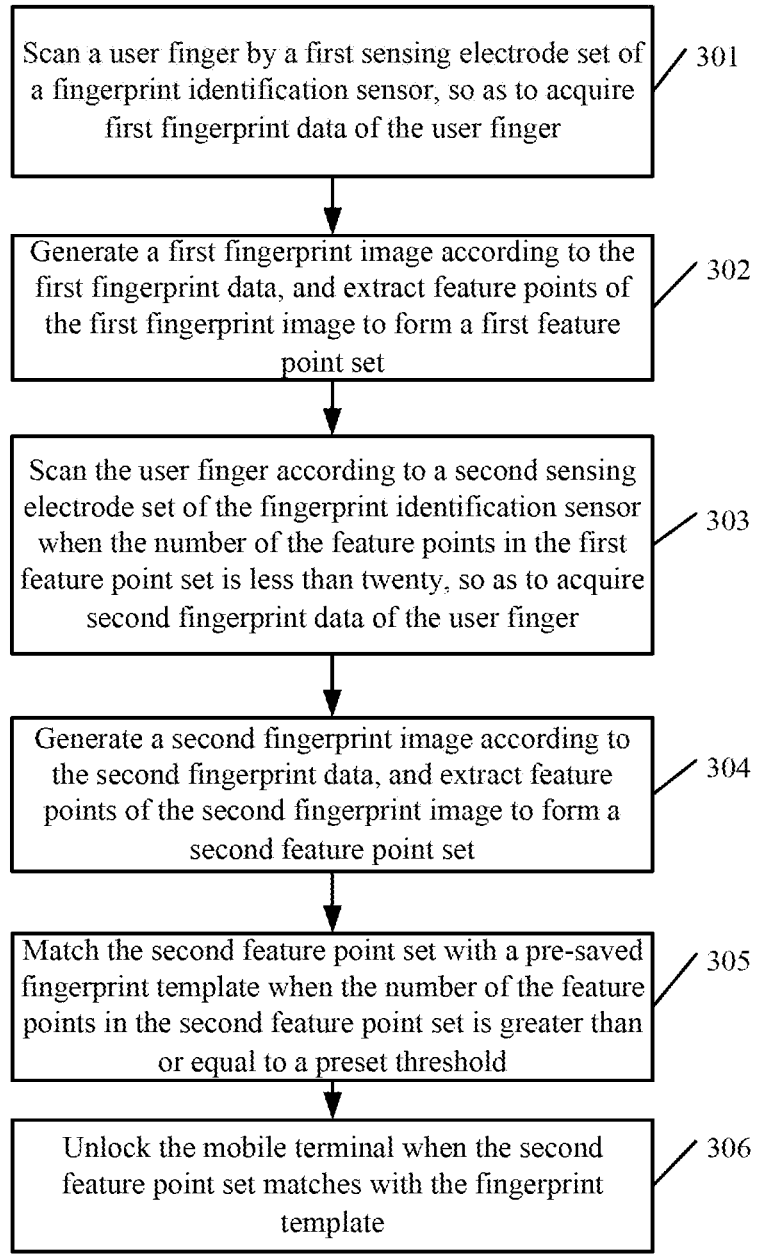
FIG. 3 is a flow chart of another method for controlling unlocking in accordance with an embodiment of the present disclosure.

Consistent with the embodiments as illustrated by FIG. 1 and FIG. 2, FIG. 3 is a flow chart of another method for controlling unlocking provided by an embodiment of the present disclosure. As illustrated in the FIG. 3, the method for controlling unlocking may begin at block 301.

At block 301, when a mobile terminal detects a touch operation on a fingerprint identification sensor of the mobile terminal, a user finger is scanned by a first sensing electrode set of the fingerprint identification sensor, so as to acquire first fingerprint data of the user finger. The fingerprint identification sensor includes a sensing electrode array of 192-lines 56-rows, and the first sensing electrode set includes sensing electrodes from the $91^{st}$ line to the $101^{st}$ line of the sensing electrode array.

At block 302, the mobile terminal generates a first fingerprint image according to the first fingerprint data, and extracts feature points of the first fingerprint image to form a first feature point set.

At block 303, when the number of the feature points in the first feature point set is less than twenty, the mobile terminal scans the user finger according to a second sensing electrode set of the fingerprint identification sensor, so as to acquire second fingerprint data of the user finger. The second sensing electrode set includes the sensing electrodes from the $187^{th}$ line to the $106^{th}$ line of the sensing electrode array.

At block 304, the mobile terminal generates a second fingerprint image according to the second fingerprint data, and extracts feature points of the second fingerprint image to form a second feature point set.

At block 305, when the number of the feature points in the second feature point set is greater than or equal to the preset threshold, the mobile terminal matches the second feature point set with a pre-saved fingerprint template.

At block 306, when the second feature point set matches with the fingerprint template, the mobile terminal is unlocked.

For the existing fingerprint unlocking solution, all feature points in a fingerprint template feature point set are matched with a reference feature point set of a user finger, and the fingerprint template feature point set of the mobile terminal stores the feature points of the fingerprints of the user finger as comprehensive as possible. Therefore, the number of the feature points in the originally stored fingerprint template feature point set is relatively large, such as 200, 210, or even above 300. While during actual fingerprint unlocking, only 20 effective feature points of the fingerprints of the user finger are generally needed to identify the user identity and perform the unlocking operation. Therefore, in the embodiment of the present disclosure, by gradually enlarging the region of the sensing electrodes for scanning the user finger, the sensing electrode region as small as possible that meets the identification requirements and safety requirements on fingerprint unlocking can be quickly touched, so as to reduce the time that the mobile terminal scans the user finger to the greatest extent. Meanwhile, the matching time of the feature points is further shortened as well by using fewer feature points of the user finger, which is beneficial for enhancing the fingerprint unlocking speed of the mobile terminal, and improving user experience.

Figure 4:
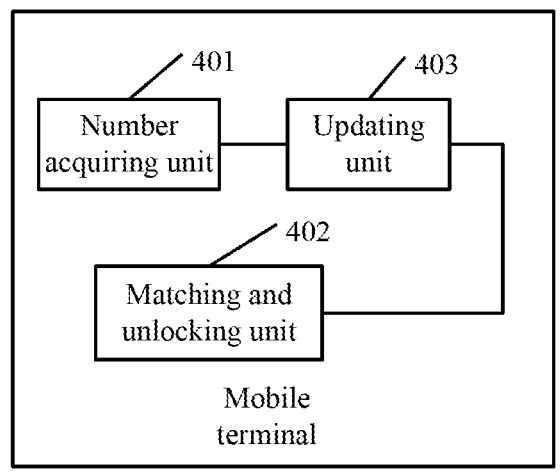
FIG. 4 is a unit constitution block diagram of a mobile terminal in accordance with an embodiment of the present disclosure.

The following is a device embodiment of the present disclosure. The device embodiment of the present disclosure is used to execute the method realized by the method embodiment of the present disclosure. As illustrated by FIG. 4, a mobile terminal can include a number acquiring unit 401 and a matching and unlocking unit 402.

The number acquiring unit 401 is configured to acquire the number of feature points in a current feature point set of a user finger. The current feature point set is formed by a mobile terminal scanning and processing the user finger according to a current sensing electrode set. The current sensing electrode set includes sensing electrodes in lines from the $[M/2]-k11^{th}$ to $[M/2]+k12^{th}$ row in a sensing electrode array of M-lines N-rows. The sensing electrode array is arranged in the fingerprint identification sensor of the mobile terminal, and M, N, k11 and k12 are positive integers.

The matching and unlocking unit 402 is configured to unlock the mobile terminal when the number of the feature points in the current feature point set is greater than or equal to the first preset threshold and the current feature point set matches with a pre-saved fingerprint template.

In at least one alternative embodiment, the matching and unlocking unit 402 being configured to match the current feature point set with the pre-saved fingerprint template includes that the matching and unlocking unit 402 is configured to calculate a matching degree between each feature point in the current feature point set and the pre-saved fingerprint template, and determine that the current feature point set matches with the pre-saved fingerprint template when the number of the feature points in the current feature point set with a matching degree greater than a preset matching degree is greater than a second preset threshold.

In at least one alternative embodiment, the mobile terminal may further include an updating unit 403 configured to add X-line sensing electrodes to the current sensing electrode set so as to update the current feature point set when the number of the feature points in the current feature point set is smaller than a first preset threshold. The X lines includes X1 adjacent lines before the [M/2]−k11 line and X2 adjacent lines after the [M/2]+k12, X1, X2 and X are positive integers, and X=X1+X2.

In at least one alternative embodiment, the updating unit 403 being configured to add the X-line sensing electrodes to the current sensing electrode set so as to update the current feature point set includes that the updating unit 403 is configured to add the X-line sensing electrodes to the current sensing electrode set so as to update the current sensing electrode set, and scan and process the user finger so as to update the current feature point set according to the updated current sensing electrode set.

In at least one alternative embodiment, the updating unit 403 being configured to scan and process the user finger so as to update the current feature point set according to the current sensing electrode set updated includes that the updating unit 403 is configured to scan the user finger according to the sensing electrodes in the updated current sensing electrode set so as to acquire the fingerprint data, generate a fingerprint image according to the fingerprint data, extract feature points of the fingerprint image, and update the current feature point set by using the feature points extracted.

In at least one alternative embodiment, the updating unit 403 being configured to scan the user finger according to the sensing electrode in the updated current sensing electrode set so as to acquire the fingerprint data includes that the updating unit 403 is configured to acquire n2 underlying data values through n2 normal sensing electrodes in the updated current sensing electrode set. The current sensing electrode set includes n1 abnormal sensing electrodes and the n2 normal sensing electrodes, and n1 and n2 are positive integers. The updating unit 403 being configured to scan the user finger according to the sensing electrode in the updated current sensing electrode set so as to acquire the fingerprint data further includes that the updating unit 403 is configured to determine n1 reference underlying data values corresponding to the n1 abnormal sensing electrodes according to the n2 underlying data values collected by the n2 normal sensing electrodes. The fingerprint data is formed by the n1 reference underlying data values and the n2 underlying data values.

In at least one alternative embodiment, the updating unit 403 being configured to determine the n1 reference underlying data values corresponding to the n1 abnormal sensing electrodes according to the n2 underlying data values collected by the n2 normal sensing electrodes includes that the updating unit 403 is configured to calculate an average value of the n2 underlying data value, and determine each of the n1 reference underlying data values corresponding to the n1 abnormal sensing electrodes to be the average value.

The updating unit 403 being configured to determine the n1 reference underlying data values corresponding to the n1 abnormal sensing electrodes according to the n2 underlying data values collected by the n2 normal sensing electrodes includes that the updating unit 403 is configured to acquire a coordinate value of each abnormal sensing electrode of the n1 abnormal sensing electrodes, and perform mean processing on each abnormal sensing electrode according to the coordinate value of each abnormal sensing electrode and the n2 underlying data values, so as to acquire the n1 reference underlying data values corresponding to the n1 abnormal sensing electrodes.

The mean processing includes the follows. x sensing electrodes of the n2 normal sensing electrodes are determined, and a distance between each of the x sensing electrodes and the coordinate value of each of the abnormal sensing electrodes subjected to the current mean processing is smaller than a preset distance. An average value of x underlying data values corresponding to the x sensing electrodes is determined, and the average value is determined to be the reference underlying data value of each of the abnormal sensing electrodes subjected to the current mean processing, and x is a positive integer.

It shall be noted that the mobile terminal described in the device embodiment of the present disclosure is illustrated in the form of functional units. The term "unit" used herein shall be taken in the broadest possible sense. Objects for realizing the function of each unit can be an application specific integrated circuit (ASIC), a single circuit, a processor (shared, specific, or chipset) for executing one or more software or hardware procedures, a memory, a combined logic circuit, and/or other appropriate assembly for realizing the above function.

Figure 5:
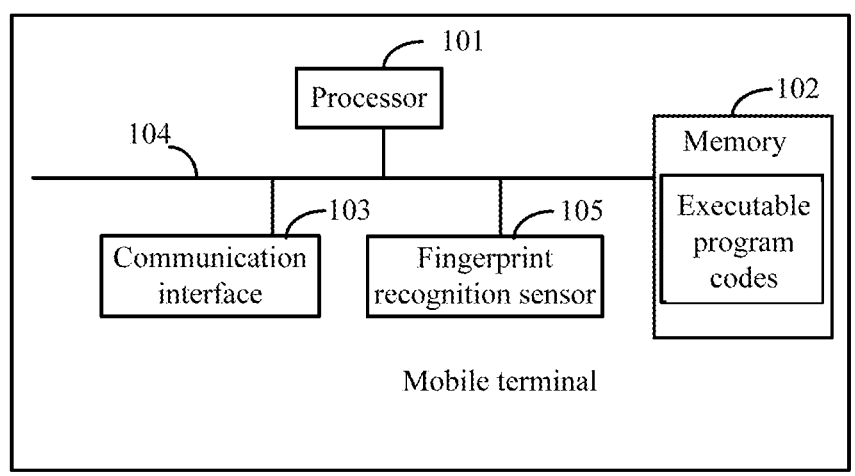
FIG. 5 is a structure diagram of a mobile terminal in accordance with an embodiment of the present disclosure.

For example, the function that the updating unit 403 updates the current feature point set can be realized by the mobile terminal of FIG. 5. The manner is that a processor 101 invokes executable program codes of a memory 102 to add X-line sensing electrodes to the current sensing electrode set so as to update the current feature point set.

For the existing fingerprint unlocking solution, all feature points in a fingerprint template feature point set are matched with a reference feature point set of a user finger, and the fingerprint template feature point set of the mobile terminal stores the feature points of the fingerprints of the user finger as comprehensive as possible. Therefore, the number of the feature points in the originally stored fingerprint template feature point set is relatively large, such as 200, 210, or even above 300. While during actual fingerprint unlocking, only 20 effective feature points of the fingerprints of the user finger are generally needed to identify the user identity and perform the unlocking operation. Therefore, in the embodiment of the present disclosure, by gradually enlarging the region of the sensing electrodes for scanning the user finger, the sensing electrode region as small as possible that meets the identification requirements and safety requirements on fingerprint unlocking can be quickly touched, so as to reduce the time that the mobile terminal scans the user finger to the greatest extent. Meanwhile, the time of matching the feature points is further shortened as well by using fewer feature points of the user finger, which is beneficial for enhancing the fingerprint unlocking speed of the mobile terminal, and improving user experience.

An embodiment of the present disclosure further provides another mobile terminal. As illustrated by FIG. 5, the mobile terminal includes the processor 101, the memory 102, a communication interface 103, a communication bus 104, and a fingerprint recognition module 105. The processor 101, the memory 102, the fingerprint recognition module 105, and the communication interface 103 are coupled and communicate with each other via the communication bus 104. The processor 101 controls wireless communication with an external cellular network. The communication bus 103 includes but not limited to an antenna, an amplifier, a transceiver, a coupler, a low noise amplifier (LNA), a duplexer, and so on. The fingerprint recognition module 105 is configured to acquire fingerprint data of a user finger. The memory 102 includes at least one of the following: a random access memory, a non-volatile memory, and an external memory. The memory 102 stores executable program codes. The executable program codes can guide the processor 101 to execute the method for controlling unlocking specifically illustrated in the method embodiment of the present disclosure.

The processor 101 acquires the number of feature points in a current feature point set of a user finger. The current feature point set is formed by the mobile terminal scanning and processing the user finger according to a current sensing electrode set. The current sensing electrode set includes sensing electrodes in lines from the [M/2]−k11$^{th}$ to [M/2]+k12$^{th}$ row in a sensing electrode array of M-lines N-rows. The sensing electrode array is arranged in the fingerprint identification sensor 105 of the mobile terminal, and M, N, k11 and k12 are positive integers.

When the number of the feature points in the current feature point set is greater than or equal to a first preset threshold and the current feature point set matches with a pre-saved fingerprint template, the processor 101 unlocks the mobile terminal.

The processor 101 adds X-line sensing electrodes to the current sensing electrode set so as to update the current feature point set when the number of the feature points in the current feature point set is less than the first preset value. The X lines includes X1 adjacent lines before the [M/2]−k11 line and X2 adjacent lines after the [M/2]+k12, X1, X2 and X are positive integers, and X=X1+X2.

For the existing fingerprint unlocking solution, all feature points in a fingerprint template feature point set are matched with a reference feature point set of a user finger, and the fingerprint template feature point set of the mobile terminal stores the feature points of the fingerprints of the user finger as comprehensive as possible. Therefore, the number of the feature points in the originally stored fingerprint template feature point set is relatively large, such as 200, 210, or even above 300. While during actual fingerprint unlocking, only 20 effective feature points of the fingerprints of the user finger are generally needed to identify the user identity and perform the unlocking operation. Therefore, in the embodiment of the present disclosure, by gradually enlarging the region of the sensing electrodes for scanning the user finger, the sensing electrode region as small as possible that meets the identification requirements and safety requirements on fingerprint unlocking can be quickly touched, so as to reduce the time that the mobile terminal scans the user finger to the greatest extent. Meanwhile, the time of matching the feature points is further shortened as well by using fewer feature points of the user finger, which is beneficial for enhancing the fingerprint unlocking speed of the mobile terminal, and improving user experience.

Additionally, the executable program codes stored in the memory 102 is further configured to execute related steps of the methods for controlling unlocking illustrated by FIG. 1, FIG. 2, and FIG. 3, for example, execute the step of adding X-line sensing electrodes to the current sensing electrode set so as to update the current feature point set, and so on.

Figure 6:
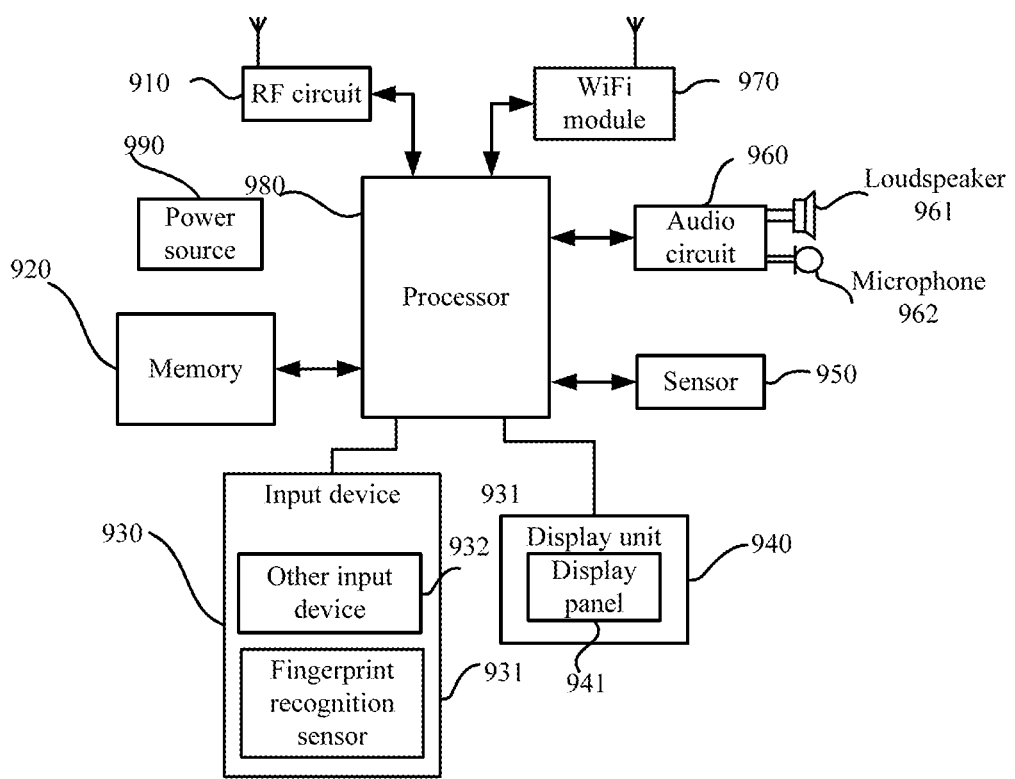
FIG. 6 is a structure diagram of another mobile terminal in accordance with an embodiment of the present disclosure.

An embodiment of the present disclosure further provides another mobile terminal. As illustrated by FIG. 6, for the sake of convenient illustration, only parts related to the embodiment of the present disclosure are illustrated, and the method embodiments of the present disclosure are referred to know technical details. The mobile terminal be a mobile phone, a tablet compute, a personal digital assistant (PDA), a point of sales (POS), an on-board computer, or other. A mobile phone is taken as an example to illustrate the mobile phone.

FIG. 6 is a structure diagram of a mobile phone in accordance with an embodiment of the present disclosure. The mobile phone may include an RF circuit 910, a memory 920, an input unit 930, a display unit 940, at least one sensor 950, an audio circuit 960, a wireless fidelity (WiFi) module 970, a processor 980, a power source 990, and the like.

The RF circuit 910 may be configured to receive and transmit signals in an information receiving and transmitting or communication process, and transmit received downlink information of a base station to the processor 980 for processing. In addition, uplink data is transmitted to the base station. Generally, the RF circuit 910 includes, but is not limited to, an antenna, at least one amplifier, a transceiver, a coupler, a low noise amplifier (LNA), a duplexer, etc. In addition, the RF circuit 910 may further communicate with other devices via wireless communication and a network. The wireless communication may use any one communication standard or protocol, including, but not limited to, a global system of nobile communication (GSM), general packet radio service (GPRS), code division multiple access (CDMA), wideband code division multiple access (WCDMA), long term evolution (LTE), an E-mail, short messaging service (SMS), etc.

The memory 920 may be configured to store software programs and modules, and the processor 980 executes various function applications and data processing of the mobile phone by running the software programs and the modules stored in the memory 920. The memory 920 may mainly include a storage program region and a storage data region. The storage program region may store an operation system, and an application program needed for at least one function (such as a function of obtaining a fingerprint image that succeeds in fingerprint matching, a function of assessing fingerprint image, a function of updating a fingerprint template, and the like). The storage data region may store data (such as history fingerprint image data that succeeds in fingerprint matching, the number of times that all fingerprint templates are successfully matched in a second time period) created according to use of the mobile phone. In addition, the memory 920 may include a high-speed RAM, and may further include a non-volatile memory such as a disk storage device, a flash device, or other non-volatile solid storage devices.

The input unit 930 may be configured to receive input digital or character information and generate key signal input associated with user setting and functional control of the mobile phone. Specifically, the input unit 930 may include a fingerprint recognition sensor 931 and other input devices 932. The fingerprint recognition sensor 931 can collect fingerprint data. In at least one alternative embodiment, the fingerprint recognition sensor 931 may include an optical fingerprint sensor, a capacitive fingerprint sensor, and a radio fingerprint sensor. The capacitive fingerprint sensor is taken as an example to illustrate the fingerprint recognition sensor. The capacitive fingerprint sensor include sensing electrodes (abnormal sensing electrodes and normal sensing electrodes), and a signal processing circuit (for example, an amplifying circuit, a noise reduction circuit, an analog-digital circuit, and so on). Besides the fingerprint recognition sensor, the input unit 930 may further include the other input devices 932. The other input devices 932 may include, but are not limited to, one or more of a physical keyboard, a functional key (such as a volume control key and a switch key), a track ball, a mouse, and an operating rod.

The display unit 940 may be configured to display information input by the user or information provided for the user or various menus of the mobile phone. The display unit 940 may include a display panel 941, and alternatively, the display panel 941 may be configured in a form of a Liquid Crystal Display (LCD), an Organic Light-Emitting Diode (OLED), etc. Furthermore, the touch panel 931 may cover the display panel 941. When the touch panel 931 detects the touch operation thereon or nearby, the touch operation is transmitted to the processor 980 to determine the type of a touch event, and then the processor 980 provides corresponding visual output on the display panel 941. Although, the touch panel 931 and the display panel 941 implement input of the mobile phone and input functions by serving as two independent parts in FIG. 6, the touch panel 931 and the display panel 941 may be integrated to implement the input of the mobile phone and the input functions in some embodiments.

The at least one sensor 950 may include a light sensor, a motion sensor and other sensors. Specifically, the light sensor may include an ambient light sensor and a proximity sensor, the ambient light sensor may adjust the luminance of a display panel 941 according to the brightness of ambient light, and the proximity sensor may close the display panel 941 and/or backlight when the mobile phone reaches nearby the ear. As one of the motion sensors, an accelerometer sensor may detect the magnitude of an accelerated speed in each direction (generally, three-axis), the size and direction of a gravity may be detected while resting, and the accelerometer sensor may be configured to identify an application of a mobile phone gesture (e.g., horizontal and vertical screen switching, relevant games, and magnetometer gesture calibration), and vibration identification relevant functions (e.g., pedometer and knocking), etc. Other sensors such as a gyroscope sensor, a barometer sensor, a hygrometer sensor, a thermometer sensor and an infrared sensor configurable for the mobile phone will not be elaborated herein.

The audio circuit 960, a loudspeaker 961, and a microphone 962 may provide an audio interface between the user and the mobile phone. The audio circuit 960 may transmit an electric signal converted from the received audio data to the loudspeaker 961, and the loudspeaker 961 converts the electric signal into a sound signal for output. Besides, the microphone 962 converts a collected sound signal into an electric signal, the audio circuit 960 converts the received electric signal into audio data and then outputs the audio data to the processor 980 for processing, the audio data is transmitted to another mobile phone via the RF circuit 910, or the audio data is output to the memory 920 for further processing.

WiFi belongs to a short-range wireless transmission technology, the mobile phone may assist the user in E-mail receiving and sending, webpage browsing, access to streaming media and the like by means of the WiFi module 970, and it provides a wireless wideband internet access for the user. Although FIG. 6 shows the WiFi module 970, it may be understood that the WiFi module 970 does not belong to necessary components of the mobile phone and can totally be omitted without changing the essence of the present disclosure as required.

The processor 980 is a control center of the mobile phone, and is configured to connect all parts of the whole mobile phone by utilizing various interfaces and lines, to run or execute the software program and/or the module stored in the memory 920, and to call data stored in the memory 920 to execute various functions and processing data of the mobile phone, so as to wholly monitor the mobile phone. Alternatively, the processor 980 may include one or more processing units. Preferably, the processor 980 may be integrated with an application processor and a modulation-demodulation processor, the application processor mainly processes an operation system, a user interface, an application program and the like, and the modulation-demodulation processor mainly processes wireless communication. It may be understood that the modulation-demodulation processor may not be integrated into the processor 980.

The power supply 990 (such as a battery) supplies power to each component. Preferably, the power supply may be connected with the processor 980 logically via a power supply management system, so as to implement functions of charging, discharging and power consumption management and the like by means of the power supply management system.

The mobile phone may further include a camera, a Bluetooth module and the like, which are not shown, though, will not be elaborated herein.

In the forgoing embodiments illustrated by FIG. 1, FIG. 2, and FIG. 3, each process may be implemented on the basis of the structure of the mobile phone.

In the foregoing embodiment illustrated by FIG. 4, the function of each unit may be implemented on the basis of the structure of the terminal phone.

The embodiments of the present disclosure also provide a computer storage medium. The computer storage medium may store a program, and the program executes some or all of the processes of any method for controlling unlocking in the method embodiments.

It is to be noted that, for the sake of simplicity, the foregoing method embodiments are described as a series of action combinations, however, it will be appreciated by those skilled in the art that the present disclosure is not limited by the sequence of actions described. That is because that, according to the present disclosure, certain steps may be performed in other order or simultaneously. Also, it will be appreciated by those skilled in the art that the embodiments described in the specification are exemplary embodiments and the actions and modules involved are not necessarily necessary for the present disclosure.

In the foregoing embodiments, descriptions of each embodiment are emphasized respectively, and parts which are not elaborated in a certain embodiment may subject to relevant descriptions of other embodiments.

The apparatus disclosed in embodiments provided herein may be implemented in other ways. For example, the device/apparatus embodiments described above are merely illustrative; for instance, the division of the unit is only a logical function division and there can be another way of division during actual implementations, for example, multiple units or components may be combined or may be integrated into another system, or some features may be ignored or not performed. In addition, coupling or communication connection between each displayed or discussed component may be direct coupling or communication connection, or may be indirect coupling or communication among devices or units via some interfaces, and may be electrical and mechanical or adopt other forms.

The units described as separate components may or may not be physically separate, the components shown as units may or may not be physical units, and namely they may be in the same place or may be distributed to multiple network elements. Part or all of the units may be selected per actual needs to achieve the purpose of the technical solutions of the embodiments.

In addition, the functional units in various embodiments of the present disclosure may be integrated in one processing unit, or each unit may be physically present, or two or more units may be integrated in one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various embodiments of the present disclosure. The memory described above includes a variety of media that can store programs codes, such as a USB disk, a read-only memory (ROM), a random-access memory (RAM), a mobile hard disk, a magnetic disk, or an optical disk and so on.

It will be understood by those of ordinary skill in the art that all or a part of the various methods of the embodiments described above may be accomplished by means of a program to instruct associated hardware, the program may be stored in a computer-readable memory, which may include a flash memory, a read-only memory (ROM), a random-access memory (RAM), Disk or CD, and so on.

The forgoing specifically illustrate the embodiment of the present disclosure. The principles and embodiments of the present disclosure are illustrated by means of examples. The above embodiment illustrations are just used to help to understand the method and core concepts of the present disclosure. For a person skilled in the art, according to the idea of the present disclosure, changes may be made based on the embodiments and application ranges. In conclusion, the present disclosure shall not be limited by the specification.

What is claimed is:

1. A method for controlling unlocking, comprising:
    acquiring, by a mobile terminal comprising a fingerprint identification sensor, number of all feature points in a current feature point set of a user finger, the current feature point set being formed by scanning and processing the user finger through a current sensing electrode set, the current sensing electrode set comprising sensing electrodes from the $[M/2]-k11^{th}$ to the $[M/2]+k12^{th}$ row in a sensing electrode array of M-rows and N-columns, the sensing electrode array being arranged in the fingerprint identification sensor of the mobile terminal, and M, N, k11, and k12 being positive integers;
    unlocking the mobile terminal when the number of all the feature points in the current feature point set is greater than or equal to a first preset threshold and the current feature point set matches with a pre-saved fingerprint template; and
    adding sensing electrodes with X lines to the current sensing electrode set to update the current feature point set when the number of all the feature points in the current feature point set is smaller than the first preset threshold, the X lines comprising X1 adjacent lines before the [M/2]−k−11 line and X2 adjacent lines after the [M/2]+k12, and X1, X2, X being positive integers, and X equals to a sum of X1 and X2.

2. The method of claim 1, wherein adding the sensing electrodes to the current sensing electrode set to update the current feature point set comprises:
    adding the sensing electrodes to the current sensing electrode set to update the current sensing electrode set; and
    scanning and processing the user finger to update the current feature point set according to the updated current sensing electrode set.

3. The method of claim 2, wherein scanning and processing the user finger to update the current feature point set according to the updated current sensing electrode set comprises:
    scanning the user finger through the sensing electrodes in the updated current sensing electrode set to acquire fingerprint data;
    generating a fingerprint image according to the fingerprint data; and
    extracting feature points of the fingerprint image, and updating the current feature point set with the feature points extracted.

4. The method of claim 3, wherein scanning the user finger according to the sensing electrodes in the updated current sensing electrode set to acquire the fingerprint data comprises:
    acquiring n2 underlying data values through n2 normal sensing electrodes in the updated current sensing electrode set, the current sensing electrode set comprising n1 abnormal sensing electrodes and the n2 normal sensing electrodes, and n1 and n2 being positive integers; and
    determining n1 reference underlying data values corresponding to the n1 abnormal sensing electrodes according to the n2 underlying data values collected by the n2 normal sensing electrodes, the fingerprint data being formed by the n1 reference underlying data values and the n2 underlying data values.

5. The method of claim 4, wherein determining the n1 reference underlying data values corresponding to the n1 abnormal sensing electrodes according to the n2 underlying data values collected by the n2 normal sensing electrodes comprises:
    calculating an average value of the n2 underlying data values; and
    determining each of the n1 reference underlying data values corresponding to the n1 abnormal sensing electrodes to be the average value.

6. The method of claim 4, wherein determining the n1 reference underlying data values corresponding to the n1 abnormal sensing electrodes according to the n2 underlying data values collected by the n2 normal sensing electrodes comprises:
    acquiring a coordinate value of each abnormal sensing electrode in the n1 abnormal sensing electrodes, and performing a meaning process on each abnormal sensing electrode according to the coordinate value of each abnormal sensing electrode and the n2 underlying data values, so as to acquire the n1 reference underlying data values corresponding to the n1 abnormal sensing electrodes;
    the meaning process comprises: determining x sensing electrodes of the n2 normal sensing electrodes, a distance between each of the x sensing electrodes and the coordinate value of each of the abnormal sensing electrodes subjected to the current mean processing being smaller than a preset distance; calculating the average value of x underlying data values corresponding to the x sensing electrodes, and determining the average value to be the reference underlying data value of each of the abnormal sensing electrodes subjected to the meaning processing, x being a positive integer.

7. The method of claim 1, wherein matching the current feature point set with the pre-saved fingerprint template comprises:
calculating a matching degree between each feature point in the current feature point set and the pre-saved fingerprint template; and
determining that the current feature point set matches with the pre-saved fingerprint template when the number of all the feature points in the current feature point set with a matching degree greater than a preset matching degree is greater than a second preset threshold.

8. A mobile terminal, comprising:
a memory configured to store computer-readable program codes; and
a processor configured to invoke the computer-readable program codes to perform:
acquiring number of all feature points in a current feature point set of a user finger, the current feature point set being formed by a mobile terminal scanning and processing the user finger according to a current sensing electrode set, the current sensing electrode set comprising sensing electrodes in lines from the $[M/2]-k11^{th}$ to $[M/2]+k12^{th}$ row in a sensing electrode array of M-lines N-rows, the sensing electrode array being arranged in a fingerprint identification sensor of the mobile terminal, and M, N, k11 and k12 being positive integers;
unlocking the mobile terminal when the number of all the feature points in the current feature point set is greater than or equal to a first preset threshold and the current feature point set matches with a pre-saved fingerprint template, and
adding sensing electrodes with X lines to the current sensing electrode set so as to update the current feature point set when the number of all the feature points in the current feature point set is smaller than the first preset threshold, the X lines comprising X1 adjacent lines before the $[M/2]-k11$ line and X2 adjacent lines after the $[M/2]+k12$, X1, X2 and X being positive integers, and X equals to a sum of X1 and X2.

9. The mobile terminal of claim 8, wherein the processor that is configured to invoke the computer-readable program codes to perform adding the sensing electrodes to the current sensing electrode set so as to update the current feature point set is further configured to perform:
adding the sensing electrodes to the current sensing electrode set so as to update the current sensing electrode set; and
scanning and processing the user finger so as to update the current feature point set according to the updated current sensing electrode set.

10. The mobile terminal of claim 9, wherein the processor that is configured to invoke the computer-readable program codes to perform scanning and processing the user finger so as to update the current feature point set according to the updated current sensing electrode set is further configured to:
scanning the user finger according to the sensing electrodes in the updated current sensing electrode set so as to acquire fingerprint data;
generating a fingerprint image according to the fingerprint data; and
extracting feature points of the fingerprint image, and updating the current feature point set by using the feature points extracted.

11. The mobile terminal of claim 10, wherein the processor that is configured to invoke the computer-readable program codes to perform scanning the user finger according to the sensing electrodes in the updated current sensing electrode set so as to acquire the fingerprint data is further configured to perform:
acquiring n2 underlying data values through n2 normal sensing electrodes in the updated current sensing electrode set, the current sensing electrode set comprising n1 abnormal sensing electrodes and the n2 normal sensing electrodes, and n1 and n2 being positive integers; and
determining n1 reference underlying data values corresponding to the n1 abnormal sensing electrodes according to the n2 underlying data values collected by the n2 normal sensing electrodes, the fingerprint data being formed by the n1 reference underlying data values and the n2 underlying data values.

12. The mobile terminal of claim 11, wherein the processor that is configured to invoke the computer-readable program codes to perform determining the n1 reference underlying data values corresponding to the n1 abnormal sensing electrodes according to the n2 underlying data values collected by the n2 normal sensing electrodes is further configured to perform:
calculating an average value of the n2 underlying data values; and
determining each of the n1 reference underlying data values corresponding to the n1 abnormal sensing electrodes to be the average value.

13. The mobile terminal of claim 11, wherein the processor that is configured to invoke the computer-readable program codes to perform determining the n1 reference underlying data values corresponding to the n1 abnormal sensing electrodes according to the n2 underlying data values collected by the n2 normal sensing electrodes is further configured to perform:
acquiring a coordinate value of each abnormal sensing electrode in the n1 abnormal sensing electrodes, and perform a mean processing on each abnormal sensing electrode according to the coordinate value of each abnormal sensing electrode and the n2 underlying data values, so as to acquire the n1 reference underlying data values corresponding to the n1 abnormal sensing electrodes;
the mean processing comprises: determining x sensing electrodes of the n2 normal sensing electrodes, a distance between each of the x sensing electrodes and the coordinate value of each of the abnormal sensing electrodes subjected to the current mean processing being smaller than a preset distance, calculating the average value of x underlying data values corresponding to the x sensing electrodes, and determining the average value to be the reference underlying data value of each of the abnormal sensing electrodes subjected to the mean processing, x being a positive integer.

14. The mobile terminal of claim 8, wherein the processor that is configured to invoke the computer-readable program codes to perform matching the current feature point set with the pre-saved fingerprint template is further configured to:

calculating a matching degree between each feature point in the current feature point set and the pre-saved fingerprint template; and determining that the current feature point set matches with the pre-saved fingerprint template when the number of all the feature points in the current feature point set with a matching degree greater than a preset matching device is greater than a second preset threshold.

* * * * *